United States Patent [19]

Bangert et al.

[11] 4,147,375
[45] Apr. 3, 1979

[54] CENTRAL ARTICULATION FOR A SELF-PROPELLING, ARTICULATED VEHICLE

[75] Inventors: Hans Bangert, Spröckhovel; Peter Waterkamp, Dortmund, both of Fed. Rep. of Germany

[73] Assignee: O&K Orenstein & Koppel Aktiengesellschaft, Berlin, Fed. Rep. of Germany

[21] Appl. No.: 864,808

[22] Filed: Dec. 27, 1977

[30] Foreign Application Priority Data

Dec. 24, 1976 [DE] Fed. Rep. of Germany ....... 2658932

[51] Int. Cl.² ............................................. B60D 1/00
[52] U.S. Cl. ................................ 280/483; 267/63 R; 267/141; 267/153
[58] Field of Search ............. 180/134; 267/153, 21 R, 267/21 A, 141, 63 R; 213/221; 280/483, 484, 485, 488, 489

[56] References Cited

U.S. PATENT DOCUMENTS

| 1,990,731 | 2/1935 | Greer | 280/492 |
| 2,656,938 | 10/1953 | Dath | 213/221 |
| 3,402,924 | 9/1968 | Rix | 267/63 R |

Primary Examiner—Joseph F. Peters, Jr.
Assistant Examiner—R. Schrecengost
Attorney, Agent, or Firm—Martin A. Farber

[57] ABSTRACT

A central articulation with pivot axles standing perpendicularly to one another for a self-driving articulated vehicle comprising two parts which are mutually moveable with respect to one another, whereby the steering is brought about by mutual pivoting of the two vehicle parts with respect to one another about a vertical axle of the central articulation and the adjustment of the vehicle to the unevenness of the ground is brought about by a mutual pendulum course of movement of the two vehicle parts with respect to one another about an axle which is horizontal in the longitudinal direction and a restoring device counteracts the pendulum course of movement of the front car and of the rear car by means of compression springs. Rubber hollow springs are prestressed by means of a tensioning device.

6 Claims, 5 Drawing Figures

CENTRAL ARTICULATION FOR A SELF-PROPELLING, ARTICULATED VEHICLE

The invention relates to a central articulation with pivot axles standing perpendicularly to one another for a self-driving or propelling articulated vehicle comprising two parts which are mutually moveable with respect to one another, whereby the steering is brought about by mutual pivoting of the two vehicle parts with respect to one another about a vertical axle of the central articulation and the adjustment of the vehicle to the unevenness of the ground is brought about by a mutual pendulum course of movement of the two vehicle parts with respect to one another about an axle which is horizontal in the longitudinal direction and a restoring device counteracts the pendulum course of movement of the front car and of the rear car by means of compression springs.

With a known, center pivot steered vehicle (German Offenlegeschrift No. 2 511 446) at least one source of force is provided in the form of helical springs for the production of a restoring force which acts in the direction of a return or setting back of the steering axle into its normal position. In connection with this the restoring force of the springs should be adjustable such that it is adjustable with the steering deflection movement, i.e., with the size or extent of the steering angle. The springs are detensioned in the zero position and the force which counteracts the pendulum course of movement first must build up out of the zero position, i.e., the restoring force had only a comparatively small value from the pendulum deflection movement zero up to a certain value, from which value on the restoring force is effective in a manner worth mentioning. Thus the lifting of the wheels from the ground could only be prevented after a larger pendulum deflection movement. It is also known that in the case of springs built-in under pressure, indeed from the beginning on there exist corresponding counter forces in both springs; however these counter forces could not be immediately effective upon the pendulum course of movement, since the forces in the zero position are the same and thus cancel and neutralize each other, i.e., although the spring which lies on the side of the pendulum deflection movement is even further pressed together and thus was aimed at an improvement with respect to the unstressed springs, this is only apparent because the unloaded spring which lies on the other side pushes and thereby weakens the restoring force of the first spring.

It is an object of the invention to provide an arrangement for production of the restoring forces during the reciprocal pendulum course of movement of the front car and of the rear car with respect to one another such that the restoring forces can directly come into action with setting-in and initiation of the pendulum course of movement on uneven ground, in order thus to guarantee that the drive wheels are securely and safely held on the ground and that the overturning load is increased by a considerable amount.

It is another object of the invention to aid the solution of abovementioned object in the manner that the rubber hollow springs (e.g., 12, 13) are prestressed by means of a tensioning or clamping device (16, 17, 17a, 18).

In a preferred development of the invention, during a pendulum course of movement of the vehicle, one compression spring (12), which is secured in the front car (1), with its pretensioned force counteracts a carrier (11) (which carrier is arranged fixedly in the rear car (2)) and the other compression spring (13) remains in its prestressed position assumed in the neutral position.

Further features and objects of the arrangement in accordance with the invention are set forth in the claims and the following description and the patent drawings.

The advantage of the arrangement in accordance with the invention resides in that out of the neutral position, the prestressed force of that spring which is engaged respectively at the time in the direction of the pendulum deflection movement immediately enters into operation as a restoring force, since the other not loaded prestressed spring exerts no reaction whatsoever on the engaged spring. The measure or extent of the prestressing of the springs can be fixed or preset such that optimum travelling and loading conditions are achieved.

With the above and other objects and advantages in view, the present invention will become more clearly understood in connection with the following detailed description of a preferred embodiment, when considered with the accompanying drawings, of which:

Figure 5:
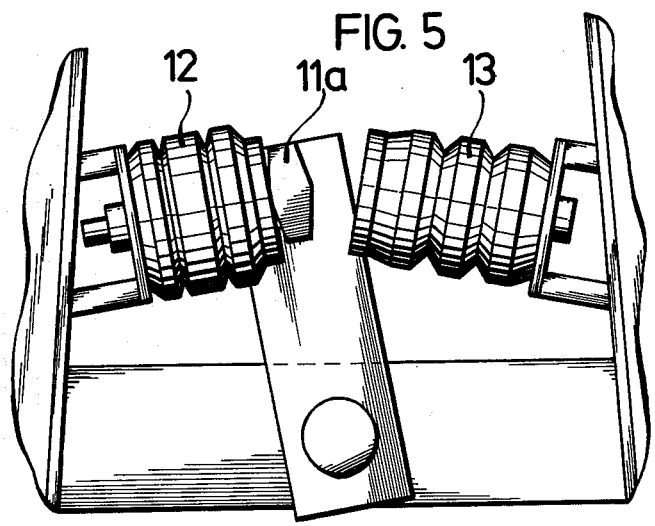
FIG. 5 is a view similar to FIG. 3, whereby however by means of the wedge-shaped carrier rigidly arranged on the rear wagon, one spring is loaded by pressure as a result of a pendulum course of movement of the front wagon with respect to the rear wagon.

The wheel loader comprises the front wagon or car 1 and the rear car 2, whereby the front car and the rear car are connected with one another by means of the central articulation 3. The front car 1 and the rear car 2 are provided with the axles 4 and 5, respectively, which axles carry rubber-tired wheels 6 and 7, respectively. By means of the steering mechanism 8 the front car 1 is pivoted about the vertical axle 9 of the central articulation 3, which axle 9 is rigidly arranged or secured in the rear car. The front car 1 and the rear car 2 can mutually pivot or move in pendulum movement with respect to one another about the horizontally arranged axle 10 of the central articulation upon uneven terrain. The carrier 11 is fixedly coupled with the rear car 2 by means of the bearings 9a and 9b of the vertical axle 9, the latter serving the horizontal pivoting. Rigidly arranged on the free end of the carrier 11 is a wedge 11a constituting a double trapezoid. Hollow rubber springs 12 and 13 are secured on holders 14 and 15, respectively, on the front car 1 in such a manner that they are directed inclined upwardly, and e.g., the rubber hollow spring 12 comes into engagement on the center of the wedge 11a of the carrier 11 in the zero or neutral position. It is evident from FIG. 5 that the rubber hollow spring 12 likewise comes into engagement on the center of the wedge 11a of the carrier 11 during the corresponding pendulum course of deflection of the car 1 with respect to the car 2 upon pivoting of the carrier 11 about the axle 10. In the entire range of the pendulum course of movement, the contact point between the respective rubber hollow spring 12, 13 and the carrier 11 lies approximately on the axial center of the rubber hollow spring.

Figure 4:
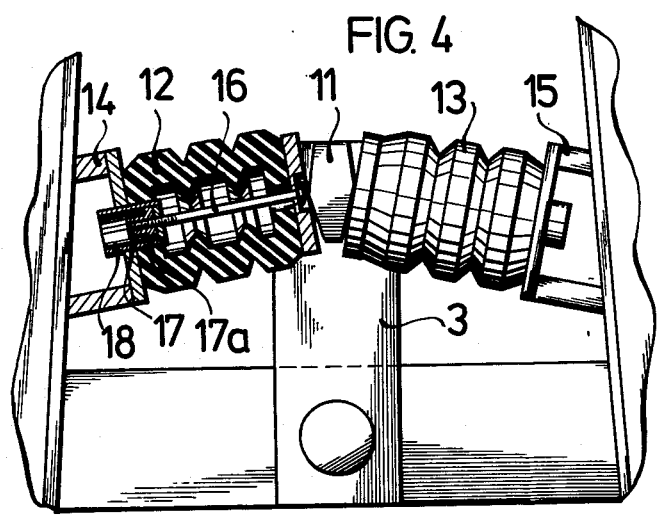
FIG. 4 is a view in the longitudinal direction of the central articulation in the neutral position partly in section.

From FIG. 4 it is evident that the prestressing of the rubber hollow spring 12 is effected by means of a clamping bolt or tightening screw 16 which extends axially centrally through the hollow spring. Adjustment nuts 17 are screwed onto the free end of the clamping bolts 16, respectively, which adjustment nuts are guided in bushings 18, the latter being secured to the holders 14, 15 and the springs 12, 13, respectively. Since the guiding of the adjustment nut 17 in the bushing 18 takes place with peripheral play by means of a narrow collar 17a of the adjustment nut 17, also with a deviation of the tightening screw 16 from its direction which it occupies in the zero or neutral position, no jamming or clamping can occur with the engagement abutment by the wedge 11a of the carrier 11. The bushings 18 have a base 18a secured to the inner end of the bushings, through which base the tensioning bolt 16 extends. In the neutral position, the collar 17a of the adjustment nut 17 which faces the base 18a abuts against the latter. An abutment member 12a, 13a, is secured on the free ends of the springs 12, 13, respectively, adjacent opposite sides of the carrier wedge 11a, the tensioning screws 16 extending into a countersunk recess in the abutment members in which the heads of the screws 16 abut thereagainst, respectively.

Figure 1:
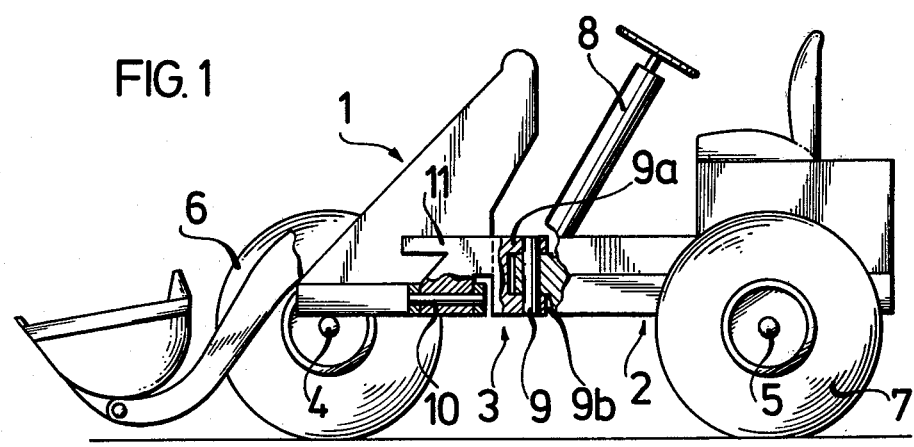
FIG. 1 is a side view of a wheel loader partly in section through the central articulation.
Figure 2:
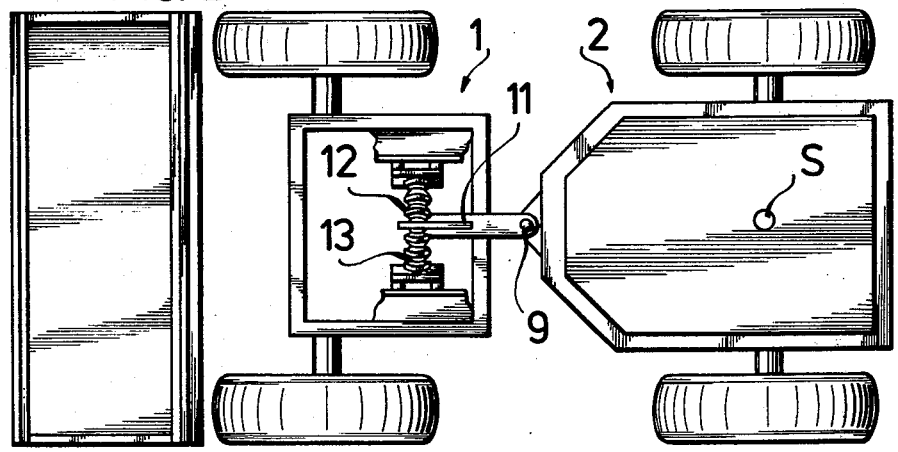
FIG. 2 is a plan view of the wheel loader with central articulation.
Figure 3:
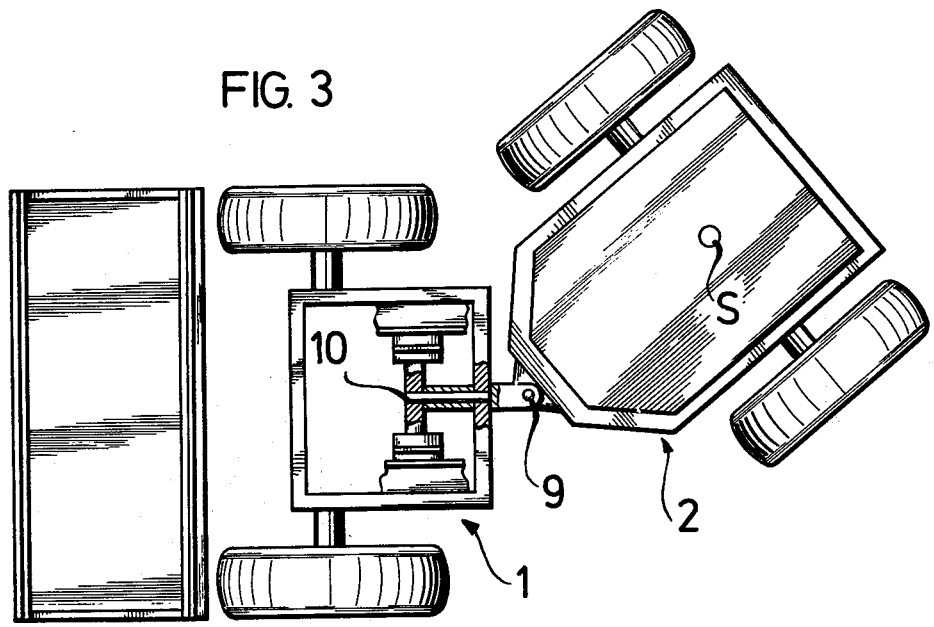
FIG. 3 is a view similar to FIG. 2 but with the wheel loader in one pivoted position, and partly in section.

The manner of operation is as follows:

As evident from FIG. 2, when driving straight the center of gravity S of the rear car 2 is located on the center line of the wheel loader, such that with a front assumed or received load, the rear car 2 is completely effective as a counterweight. With the steering of the vehicle, however, i.e., when the front car 1 is pivoted relative to the rear car 2, not only does the effective lever arm of the front car 1 decrease with respect to the rear car 2, but rather also the support moment of the front car 1 decreases, the greater the pivoting deflection becomes with the steering.

However as a consequence of the pretensioned rubber hollow springs 12, 13, a restoring force is effective as a result of the unevenness of the ground with the slightest pendulum deflection with respect to the zero position. This restoring moment of the engaged rubber hollow spring 12, which restoring moment counteracts the pendulum deflection movement, is completely effective since the second likewise prestressed rubber hollow spring 13 which lies on the opposite side can exert no force whatsoever on the carrier 11 (note FIG. 5).

The invention is not limited to the previously described embodiment example, but moreover also instead of the rubber hollow springs, other spring elements, e.g. steel springs, can be used (generically all types being hereby defined and understood as included in the term "rubber hollow springs" in the claims). The securing of the rubber hollow springs and of the carrier can also take place opposite or reverse to that as stated in the description.

While we have disclosed preferred embodiments of the invention, it is to be understood that these embodiments are given by example only and not in a limiting sense.

We claim:

1. In a central articulation with pivot axles standing perpendicularly to one another for a self-propelling articulated vehicle comprising two vehicle parts, including a front car and a rear car, which are mutually moveable with respect to one another, whereby the steering takes place by mutual pivoting of the two vehicle parts with respect to one another about a vertical axle of the central articulation and the adjustment of the vehicle to unevenness of the ground takes place by a pendulum course of movement of the two vehicle parts with respect to one another about an axle which is horizontal in the longitudinal direction and a restoring device counteracts the pendulum course of movement of the front car and of the rear car by means of compression springs, the improvement comprising
   means comprising rubber hollow springs for cooperatively providing a restoring force counteracting the pendulum course of movement of the front car relative to the rear car,
   tensioning means for prestressing said hollow springs, said tensioning means comprises,
   a tensioning screw extends along a central axis of each of said hollow springs and operatively engages the latter,
   holders connected to the front car and to said hollow springs, respectively,
   bushings mounted in said holders and said hollow springs, respectively,
   an adjustment nut is each adjustably threaded on said tensioning screw and is guided in said bushings, respectively, with peripheral play.

2. The central articulation as set forth in claim 1, wherein
   each of said bushings has a base secured thereto,
   said adjustment nut is formed with a narrow collar facing said base of the bushing.

3. The central articulation as set forth in claim 2, wherein
   said collar of said adjustment nut abuts said base in a neutral position.

4. In a central articulation with pivot axles standing perpendicularly to one another for a self-propelling articulated vehicle comprising two vehicle parts, including a front car and a rear car, which are mutually moveable with respect to one another, whereby the steering takes place by mutual pivoting of the two vehicle parts with respect to one another about a vertical axle of the central articulation and the adjustment of the vehicle to unevenness of the ground takes place by a pendulum course of movement of the two vehicle parts with respect to one another about an axle which is horizontal in the longitudinal direction and a restoring device counteracts the pendulum course of movement of the front car and of the rear car by means of compression springs, the improvement comprising
   means comprising rubber hollow springs for cooperatively providing a restoring force counteracting the pendulum course of movement of the front car relative to the rear car,
   tensioning means for prestressing said hollow springs,
   said rubber hollow springs are secured in the front car,
   a carrier fixedly arranged in the rear car,
   said rubber hollow springs are arranged relative to said carrier such that one of said springs with its pretensioned force counteracts said carrier during the pendulum course of movement of the vehicle and the other of said rubber hollow springs remains in its prestressed position assumed in a neutral position,
   said carrier includes a double-sided trapezoidal-shaped wedge disposed between said springs and adapted to abut said springs, said rubber hollow springs, respectively, and said carrier abut at a contact point substantially on the axial center of said rubber hollow springs, respectively, in the entire range of the pendulum course of movement.

5. The central articulation as set forth in claim 4, further comprising a horizontal axle extending in the longitudinal direction of and mounted in the front car, said carrier is pivotally mounted on said horizontal axle, whereby the pendulum course of movement effects a pivoting of said carrier relative to the front car, said hollow springs constitute two springs secured to the front car, each of said two springs has a free end adjacent to and on opposite sides of said wedge of said carrier, said springs each extend inclined upwardly in a direction toward said free end, said tensioning means for limiting the maximum extent of expansion of said springs to a maximum in the neutral position, whereby when said carrier is pivoted relative to the front car one of said two springs is further compressed by said double-sided trapezoidal-shaped wedge providing the restoring force and the free end of the other of said two springs remains in its neutral position yet spaced from said wedge.

6. The central articulation as set forth in claim 5, wherein said hollow springs constitute accordion-like pleated substantially cylindrical spring members.

* * * * *